No. 822,239. PATENTED JUNE 5, 1906.
A. C. & G. Q. BEDORTHA.
TREATMENT OF TOBACCO.
APPLICATION FILED FEB. 15, 1906.
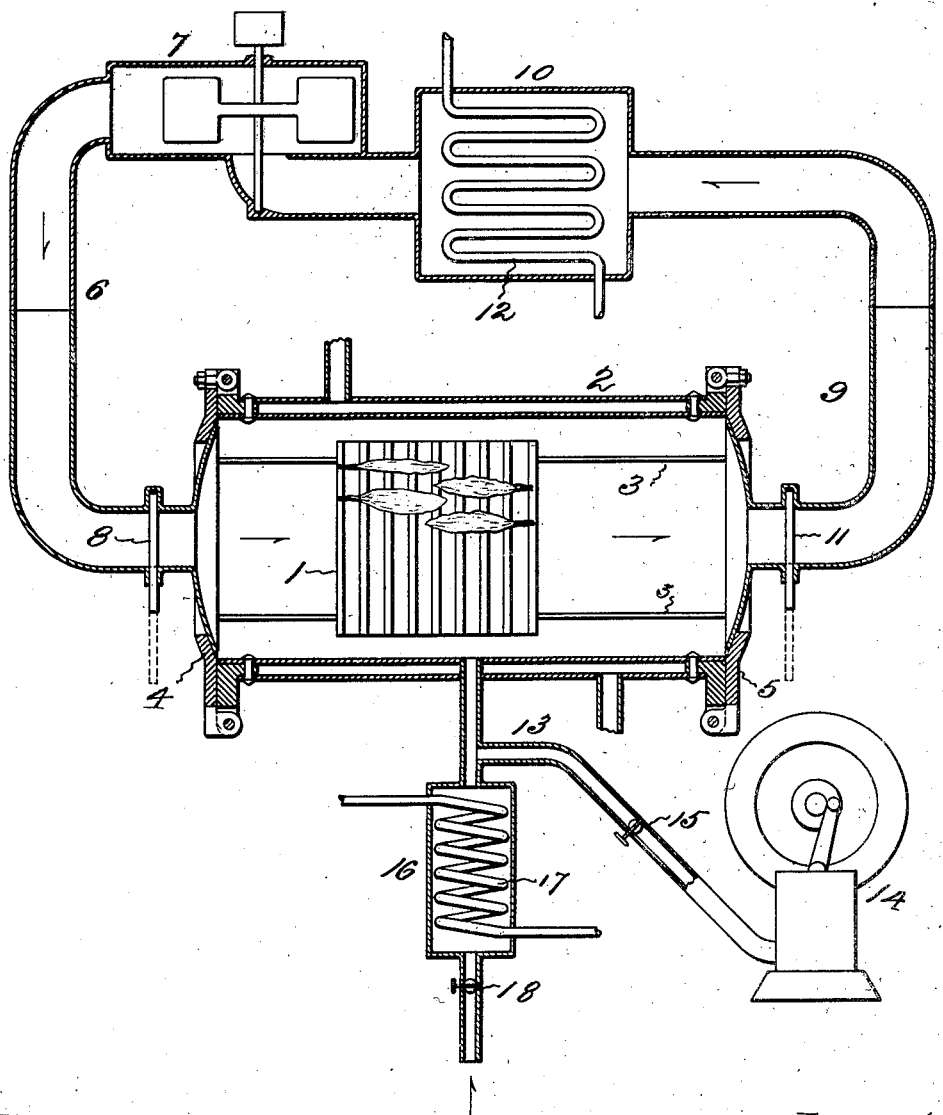
Witnesses.
C. F. Storrs
Ethel M. Lowe.
Inventors
Alfred C. Bedortha &
George Q. Bedortha by
Harry P. Williams
Attorney.

UNITED STATES PATENT OFFICE.

ALFRED C. BEDORTHA AND GEORGE Q. BEDORTHA, OF WINDSOR, CONNECTICUT.

TREATMENT OF TOBACCO.

No. 822,239.      Specification of Letters Patent.      Patented June 5, 1906.

Application filed February 15, 1906. Serial No. 301,206.

*To all whom it may concern:*

Be it known that we, ALFRED C. BEDORTHA and GEORGE Q. BEDORTHA, citizens of the United States, residing at Windsor, in the county of Hartford and State of Connecticut, have invented a new and useful Treatment of Tobacco, of which the following is a specification.

The bouquet of smoking-tobacco is affected by the character of the bacteria and spores on the leaf. A more esteemed flavor may be imparted to tobacco naturally having an inferior flavor by destroying the bacteria and spores which propagate on the leaf as the result of the conditions under which it is grown and substituting a cultivated bacteria which will produce the desired fragrance. This can be accomplished by ridding the leaves of exterior moisture by artificial or natural heat and submitting the dried leaves to a sterilizing treatment of such character, temperature, and duration as will destroy the original bacteria and spores existing thereon and then supplying to the sterilized leaves the specific bacteria or cultures thereof which will cause such action during the subsequent fermentation as will produce the characteristic flavor when the tobacco is smoked.

This invention relates to the treatment of tobacco undergoing such a process.

The object of the invention is to provide a simple, easily conducted, and inexpensive sterilizing treatment which will surely in a short time destroy all of the original bacteria and spores and leave the tobacco in good condition to receive the cultivated bacteria, which are subsequently applied without deleteriously affecting the texture of the leaves. This treatment may be carried on by various apparatus. One form of apparatus which may be used for the purpose is illustrated by the sectional plan shown in the accompanying drawing.

The tobacco in bunches or hands to be treated is loosely laid out on open trays 1 and placed in a chamber 2. It is preferred to pile the trays on a truck which can be easily rolled into the chamber on a track 3. The chamber has a hinged door 4 at one end, which may be opened to permit the truck with the trays of tobacco to be moved into the chamber and a hinged door 5 at the other end which may be opened for the purpose of allowing the removal of the truck. These doors are arranged so they may be fastened tightly against the ends of the chamber, but may be easily swung when the fastenings are loosened. It is preferred to have the walls of the chamber double and to connect the space between the walls with a steam-supply, so that the chamber may be kept warm for the purpose of preventing the collection and precipitation of moisture on the tobacco in the interior.

A pipe 6, that opens through the door 4, connects one end of the chamber with the outlet of a blower 7. The section of this pipe that is connected with the door is jointed, so that the door may be swung open when its fastenings are removed. A gate 8 is arranged in this pipe, so that the communication through it may be closed when desired. A pipe 9, opening through the door 5, connects the other end of the chamber with the inlet of a heating-box 10. This pipe is also jointed, so that the door may be opened, and it is provided with a gate 11, by which communication through it may be cut off.

In the heating-box is a coil of pipe 12, which is connected with a steam-supply for the purpose of heating the air that flows through the box. The outlet from the box is connected with the inlet to the blower.

An exhaust-pump 14 is connected with the chamber by a pipe 13. This pipe is preferably provided with a valve 15, which may be used for closing communication between the pump and the chamber. Communicating with the exhausting-pipe is a heating-box 16, containing a coil 17, that is adapted to be connected with a steam-supply. A valve 18 is provided for controlling the flow of air into this heating-box.

In carrying out this invention the bunches of tobacco-leaves are first thoroughly dried in order to evaporate all of the free water or moisture from the surfaces of the leaves. These dried leaves loosely placed upon the open trays so that air may circulate around and between them, are put in the chamber, and when the ends of the chamber are tightly closed they are subjected to a flow of hot air. The flow of hot air is produced by the rotation of the fan, which draws air out of the chamber over the steam-coils in the heating-box and then forces the heated air back into the chamber. This circulation of heated air is continued until the air in the chamber has reached a temperature (approximately 250° Fahrenheit) which is sufficiently high to destroy the bacteria and spores existing on the tobacco. It is not to be understood that the invention is limited to the employment of this exact temperature, nor that it is essential that all the bacteria and spores shall be killed by subjecting them to the action of circulating hot air.

It has been found in practice that there are small pockets or air-spaces between some of the leaves which are treated by the circulation of hot air which will not be raised to a temperature sufficiently high to kill the bacteria and spores on the surfaces about the pockets. In order to insure a complete circulation and the filling of these pockets with sterilizing-air sufficiently to kill the bacteria and spores after as much has been done as can be with the circulation of heated air, the gates in the circulating-pipes are closed, and then the exhaust-pump is set in operation and air is exhausted from the chamber until there is, say, perhaps, a twenty-inch barometric pressure in the interior. When the chamber has been sufficiently exhausted, air is allowed to flow gradually into the interior over the steam-pipes in the heating-box adjacent to the vacuum-pump. The hot air that enters under these conditions permeates the leaves and fills the exhausted pockets and destroys the bacteria and spores which were not affected by the previous heating. The tobacco is subjected to the action of this heated air for perhaps thirty minutes. It is to be understood that if all of the bacteria and spores are not destroyed after the first withdrawal of air from the pockets by the action of the vacuum-pump the process may be repeated until sufficient heat is conveyed into the interior between the leaves to cause the required destruction of the bacteria and spores.

The air at atmospheric pressure, which is let into the chamber after exhaustion, may be admitted through either of the hot boxes, as desired, and the fan which produces the circulation in the interior may be or may not be kept in operation while the chamber is being exhausted and refilled, and it is to be understood that the degree of vacuum is not absolutely fixed, that degree being used which will assure the entrance of the hot air into all of the pockets that may exist between the leaves.

The sterilized tobacco after being removed from the chamber may be set aside to be again subjected to a second sterilization, if desired, in case undeveloped spores existing on the tobacco have not been destroyed. The steam-jacket about the exterior of the chamber keeps the interior warm and of uniform temperature and prevents the accumulation or precipitation of moisture therein, which is particularly advantageous when the apparatus is employed for sterilizing leaves which are to be used for cigar-wrappers.

The tobacco after having been thoroughly sterilized and after it has cooled is inoculated or coated with bacteria obtained from tobacco the flavor of which is to be reproduced or with cultures of such bacteria. This inoculation may be produced by dipping or spraying or any other convenient method. After inoculation the tobacco may be moistened and then packed in any desirable way under conditions which will allow the bacteria to develop and fermentation to ensue. As a result of this exhaustion process the sterilization can be accomplished in a very short time, so that the texture of the leaves will not be deleteriously affected by the heat to which they are subjected. This leaves the tobacco very flexible and elastic.

The invention claimed is—

1. The treatment of tobacco which consists in subjecting the leaves to the action of hot air below atmospheric pressure, substantially as described and for the purpose specified.

2. The treatment of tobacco which consists in drying the leaves, and then subjecting the dried leaves to the action of hot air below atmospheric pressure, substantially as described and for the purpose specified.

3. The treatment of tobacco which consists in subjecting the leaves to the action of hot air in artificial circulation above atmospheric pressure, and then subjecting the leaves to the action of hot air below atmospheric pressure, substantially as described and for the purpose specified.

4. The treatment of tobacco which consists in subjecting the leaves to the action of hot air in artificial circulation, and then exhausting air from the leaves and afterward subjecting the leaves to the action of hot air at atmospheric pressure, substantially as described and for the purpose specified.

5. The treatment of tobacco which consists in completely drying the leaves of the tobacco, subjecting the dried leaves to the action of hot air in artificial circulation, exhausting the air from the leaves, then admitting hot air to the leaves until they are subjected to hot air at substantially atmospheric pressure, substantially as described and for the purpose specified.

ALFRED C. BEDORTHA.
GEORGE Q. BEDORTHA.

Witnesses:
 ETHEL M. LOWE,
 HARRY R. WILLIAMS.